UNITED STATES PATENT OFFICE.

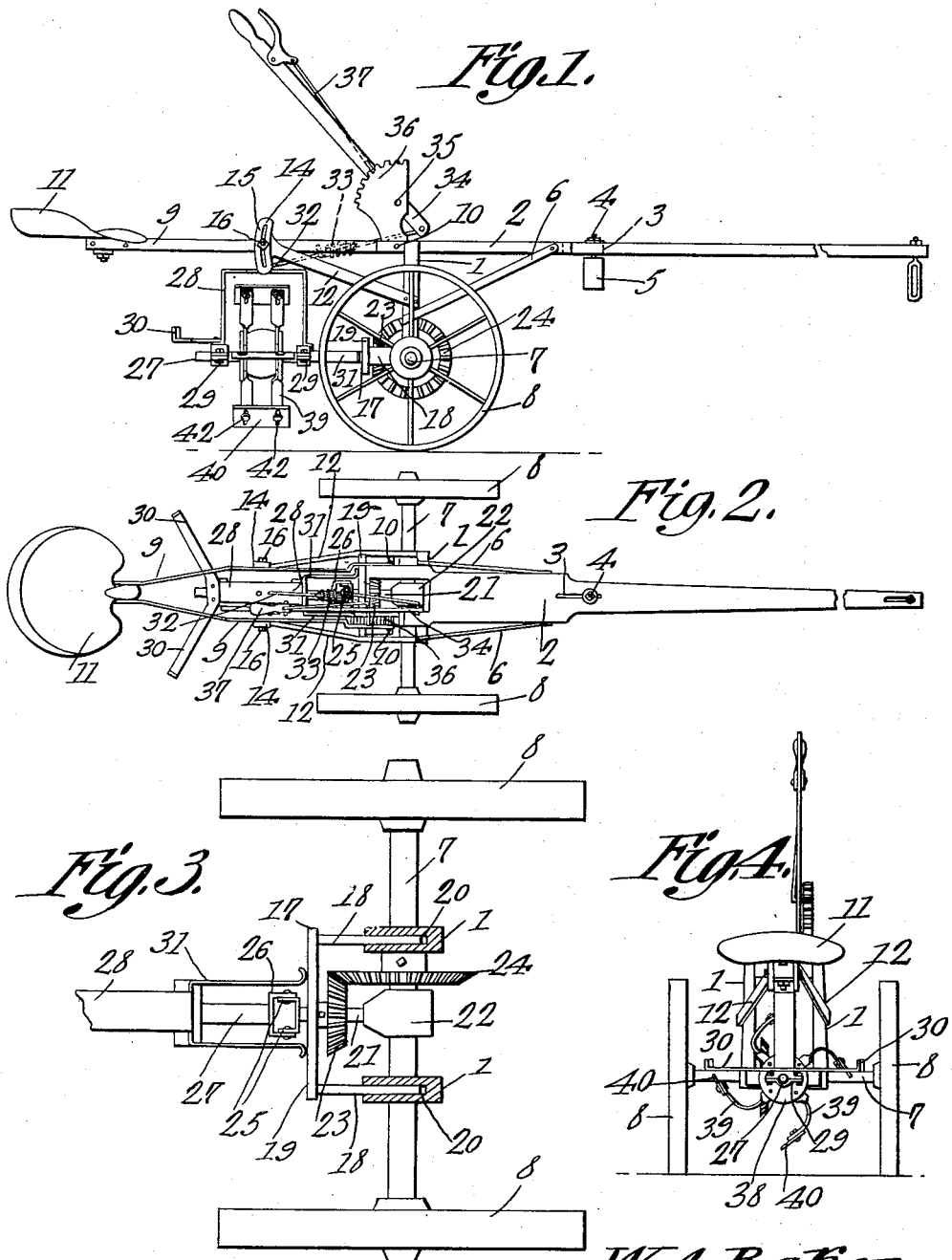

WILLIAM A. BAKER, OF GEORGETOWN, TEXAS.

COTTON-CHOPPER.

1,131,028.     Specification of Letters Patent.     Patented Mar. 9, 1915.

Application filed August 17, 1914. Serial No. 857,235.

*To all whom it may concern:*

Be it known that I, WILLIAM A. BAKER, a citizen of the United States, residing at Georgetown, in the county of Williamson and State of Texas, have invented a new and useful Cotton-Chopper, of which the following is a specification.

The device forming the subject matter of this application is a cotton chopper and one object of present invention is to provide an implement of this type in which the chopper shaft is mounted for vertical swinging movement and is yieldingly supported, to the end that the chopper shaft may be depressed by the feet of the operator, thereby permitting the chopper to operate properly when the implement is passing over uneven ground, the construction being such that the chopper shaft and the chopper may rise readily, should the chopper encounter a stump, rock, or other projection on the surface of the soil.

Another object of the invention is to provide a device of the type above described in which the rotatable chopping element includes a plurality of blades, the blades being set closely together, or at least being pluralized, so that the rotatable chopping element may be turned at a slow speed, thereby to avoid a knocking of the standing crop.

The invention aims to improve the driving mechanism for the rotatable chopping element, and to provide novel means for supporting the same.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows the invention in side elevation; Fig. 2 is a top plan; Fig. 3 is a fragmental horizontal section; Fig. 4 is a rear elevation.

In carrying out the present invention there is provided a wheel mounted frame, the same including uprights 1, between which is secured a tongue 2 provided with a longitudinal slot 3 receiving for adjustment a bolt 4 or the like, the same supporting a weight 5, the construction being such that the weight may be shifted longitudinally of the tongue to effect a counterbalancing of the structure. Braces 6 extend between the uprights 1 and the tongue 2.

Journaled for rotation in the lower ends of the uprights 1 is an axle 7 to the ends of which are secured ground wheels 8.

Rearwardly extended arms 9 are pivoted as indicated at 10 to the rear end of the tongue 2, the rear ends of the arms 9 supporting a seat 11. Braces 12 are secured to the uprights 1, the rear ends of the braces 12 terminating in transverse heads 14 having elongated slots 15, receiving bolts 16 or the like which coöperating with the arms 9 serve as a means for upholding the arms 9 and the seat 11, the construction being such that by loosening the bolts, the seat 11 may be raised and lowered at the will of the operator.

The invention includes, as shown best in Fig. 3, a U-shaped frame denoted generally by the numeral 17, the frame 17 comprising forwardly extended arms 18 and a connection 19 between the rear ends of the arms. The forward ends of the arms 18 enter slots 20 in the uprights 1 and are mounted to swing on the axle 7. Journaled for rotation in the connection 19 of the U-shaped frame 17 is a shaft 21, the forward end of which is received rotatably in a bearing 22 mounted loosely on the axle 7. Secured to the shaft 21 is a beveled pinion 23 meshing into a beveled pinion 24 secured to the axle 7. It will now be obvious that if the frame 17 is to swing vertically, the frame must swing from a center which is concentric with the axis of rotation of the beveled pinion 24. It is for this reason that the forward ends of the arms 18 of the U-shaped frame 17 are pivotally mounted upon the axle 7.

To the rear of the connection 19 of the U-shaped frame 17, the shaft 21 terminates in bifurcations 25. Other bifurcations 26 are formed on the forward end of a chopper shaft 27.

The invention includes an upwardly extended, arched yoke 28 having bearings 29 at its ends, in which bearings the chopper shaft 27 is journaled. Projecting rearwardly from the yoke 28 are foot rests 30. Adjacent its lower, forward end, the yoke 28 is extended to form spaced, forwardly presented arms 31. The forward ends of the arms 31 bear against the connection 19 of the U-shaped frame 17 to steady the yoke and parts carried thereby.

United with the upper portion of the U-shaped yoke 28 is a connection 32 in which is interposed a spring 33. The forward end of the connection 32 is pivoted to the lower end of the lever 34 fulcrumed as shown at 35 on a segment 36 carried by the tongue 2. The lever 34 is equipped with suitable latch mechanism indicated at 37 and adapted to coöperate with the segment.

The rotatable chopping element includes a hub 38 secured to the chopper shaft 27 between the forward and rear portions of the arched yoke 28. Projecting radially from the hub 38 are arms 39, the ends of which carry blades 40. The blades 40 preferably are slotted transversely, to receive securing elements 42 which unite the blades with the arms 39.

In practical operation, the U-shaped yoke 28 together with the rotatable chopping element may be raised and lowered through the instrumentality of the lever 34 and the connection 32 to effect a standard and approximate adjustment. When the implement is passing over uneven ground, the U-shaped yoke 28 and the rotatable chopping element may be lowered, the same being pressed down by the feet of the operator, pressure being exerted upon the foot rests 30. In this manner, the rotatable chopping element will conform to irregularities in the surface of the soil and will not clip the tops of the cotton in low places. Should the rotatable chopping element encounter a stump, rock or other obstruction, the shaft 27 will swing upwardly, the yieldable connection 32 and the spring 33 permitting this operation.

It is to be noted that so soon as foot pressure is removed from the rests 30, the spring 33 will react to elevate the chopper shaft 27 and to dispose the rotatable chopping element in its normal position. When the shaft 27 swings downwardly at its rear end, in the manner hereinbefore set forth, the center of downward swinging movement of the shaft is the axle 7 on which the arms 18 of the frame 17 are pivoted, the bearing 22 rocking on the axle 7 and the beveled pinion 23 moving downwardly upon the periphery of the beveled pinion 24.

The connection between the shafts 21 and 27, indicated at 25—26 may be taken as typical of any sort of connection adapted for the ends in view and for the operations required during the manipulation of the device.

Having thus described the invention, what is claimed is:—

1. In a device of the class described, a main frame; an axle journaled thereon; a supplemental frame mounted to swing vertically with respect to the main frame; a chopper shaft journaled in the supplemental frame; means for operatively connecting the chopper shaft with the axle; a yoke in which the chopper shaft is journaled; means for supporting the yoke; and forwardly presented elements connected with the yoke and in contact with the supplemental frame on opposite sides of the chopper shaft.

2. A cotton chopper embodying a main frame; an axle journaled therein; a ground wheel on the axle; a supplemental frame pivoted to the axle; a chopper shaft journaled in the supplemental frame; means for operatively connecting the chopper shaft with the axle; a yoke having bearings receiving the chopper shaft; a lever fulcrumed on the main frame; and a yieldable connection between the lever and the yoke.

In testimony that I claim the foregoing as my own, I have hereto affixed my signature in the presence of two witnesses.

WILLIAM A. BAKER.

Witnesses:
R. Z. BAKER,
JOHN TEAGUE.

Copies of this patent may be obtained for five cents each, by addressing the "Commissioner of Patents, Washington, D. C."